Patented Sept. 19, 1950

2,522,537

UNITED STATES PATENT OFFICE 2,522,537

DITHIONATE PROCESS FOR PRODUCTION OF ZINC HYDROXIDE FROM ZINC OXIDIZED ORES

Sol Frederick Ravitz and Alexander E. Back, Salt Lake City, Utah, assignors to the United States of America as represented by the Secretary of the Interior No Drawing. Application July 16, 1949, Serial No. 105,262

1 Claim. (Cl. 23—147)

(Granted under the act of March 3, 1883, as amended April 30, 1928; 370 O. G. 757)

The invention described herein may be manufactured and used by or for the Government of the United States for government purposes without the payment to us of any royalty thereon in accordance with the provisions of the act of April 30, 1928 (Ch. 460, 45 Stat. L. 467).

This invention relates to improvements in the hydrometallurgy of zinc, and more particularly, to the production of zinc oxide and zinc hydroxide from oxidized ores of zinc of sulfide ores of zinc which can be converted to the oxidized state by roasting.

Heretofore, it has been proposed to recover zinc values from zinc ores by extraction with sulfuric acid, removal of the resulting zinc sulfate solution, then treatment with calcium chloride to yield a zinc chloride solution and insoluble calcium sulfate, the zinc in turn being recovered from the resulting zinc chloride by such methods as neutralization with lime. This process has many disadvantages, the principal one being high consumption of sulfuric acid and calcium chloride. In order to overcome these disadvantages, it has heretofore been proposed to treat the oxidized zinc ores with sulfur dioxide and water, thereby to secure various sulfites of zinc. Insofar as we are aware, however, the sulfite process has not gone into extensive commercial use.

This invention has for an object the production of zinc hydroxide from oxidized ores of zinc by an improved hydrometallurgical process. Another object is the preparation of zinc oxide and hydroxide from oxidized ores of zinc employing a cyclic precipitation and solution yielding ca'cium sulfate as a valuable byproduct. By the expression "oxidized ores of zinc" is meant impurity-containing oxides, carbonates or silicates of zinc, or the product resulting from the calcination of zinc sulfide ores which may contain sulfates of zinc in addition to oxides.

The foregoing and other objects hereinafter apparent are accomplished in accordance with this invention which provides a process for the production of zinc hydroxide from oxidized ores of zinc by treating an aqueous mixture of such an ore with sulfur dioxide under oxidizing conditions to dissolve the zinc values as zinc dithionate and zinc sulfate, separating the zinc solution from insoluble gangue materials, treating the solution thus formed with calcium dithionate to precipitate calcium sulfate and convert the sulfate of zinc to zinc dithionate, separating the sulfate precipitate, then treating the resulting low-sulfate dithionate solution with calcium hydroxide to form soluble calcium dithionate and purified zinc hydroxide precipitate, removing and recovering zinc hydroxide, and returning the calcium dithionate to treatment of further sulfate-containing zinc solutions as before.

It will thus be seen that this invention particularly provides for the conversion of zinc sulfate to zinc dithionate by reaction with calcium dithionate to precipitate calcium sulfate, thus allowing for the subsequent precipitation of zinc hydroxide with lime to regenerate calcium dithionate for future use in the process. One of the features of this invention which adds to its economy is that zinc dithionate is produced by passing two equivalents of sulfur dioxide and one equivalent of oxygen into an aqueous mixture of ore containing zinc oxide (based on the zinc oxide content thereof).

The chemistry of dithionic acid has been reported by D. M. Yost and R. Pomeroy in an article entitled "The Decomposition and Oxidation of Dithionic Acid," Journal American Chemical Society, vol. 49, pages 703–707 (1927) and by H. Bassett and A. J. Henry in an article entitled "The Formation of Dithionate by the Oxidation of Sulfurous Acid and Sulfites," Journal Chemical Society (1935), pages 914 to 929.

In the instant improvement, the following equations may express the course of the reaction, although it is not intended to be restricted by any theoretical explanation of the results achieved:

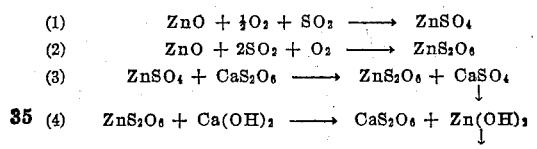

(1) $\quad ZnO + \tfrac{1}{2}O_2 + SO_2 \longrightarrow ZnSO_4$ (2) $\quad ZnO + 2SO_2 + O_2 \longrightarrow ZnS_2O_6$ (3) $\quad ZnSO_4 + CaS_2O_6 \longrightarrow ZnS_2O_6 + CaSO_4\downarrow$ (4) $\quad ZnS_2O_6 + Ca(OH)_2 \longrightarrow CaS_2O_6 + Zn(OH)_2\downarrow$ By the treatment of oxidized zinc ores with an excess of sulfur dioxide and oxygen in aqueous suspension, there results a mixture of zinc sulfate and zinc dithionate in solution. The solution may also contain some free sulfur dioxide and bisulfite ion, but these do not interfere with the instant process. A spent residue of gangue together with the lead and noble metal values remain undissolved. Any traces of copper or the like which may have been dissolved during this treatment can be removed by passing the solution over metallic zinc turnings or the like whereby they are precipitated out of solution and an equivalent amount of metallic zinc replaces them in the solution.

By treating the solution containing some zinc sulfate with calcium dithionate in accordance with Equation 3, it is seen that calcium sulfate is precipitated from solution and the solution contains substantially all of its zinc in the form of zinc dithionate. Thereupon, the zinc dithionate solution, separated from the previously precipitated calcium sulfate, can be treated with lime in an amount sufficient to precipitate substantially all of the zinc as zinc hydroxide while regenerating calcium dithionate in solution for future use in the process.

Suitable ores of zinc for employment in accordance with this invention include the oxidized zinc ores and those zinc ores which can be calcined to the oxidized state. In general, it is preferred to operate on zinc ores containing a substantial proportion of sulfide inasmuch as a preliminary roast enables the recovery of sulfur dioxide admixed with air for the leaching step. After a preliminary roast, if necessary, the oxidized zinc ores, now containing a substantial proportion of zinc oxide, are suitably comminuted and mixed with sufficient water to form a fluid pulp. Thereupon, sulfur dioxide and oxygen, preferably in the form of atmospheric air, are bubbled through the suspension until all of the available zinc values are brought into solution, largely in the form of a mixture of zinc sulfate and zinc dithionate. After the treatment with oxygen and sulfur dioxide, the solution thus formed is separated from the insoluble material by decantation, filtration or the like. The lead, silver, and other values which may be in the original ore thus remain in the solid residue and can be worked up. At this point, the resulting solution is then treated with an amount of calcium dithionate sufficient to convert substantially all of the dissolved zinc to zinc dithionate. Calcium sulfate separates from solution and in general, it has been found that the portionwise addition of calcium dithionate to the zinc solution until no further calcium sulfate separates, results in a satisfactory conversion of zinc sulfate to zinc dithionate. An excess of calcium dithionate at this point does no particular harm.

The precipitated calcium sulfate is then removed from the solution by decantation, filtration, or the like, and the resulting dithionate solution is treated with an amount of lime, preferably in the form of calcium hydroxide, to precipitate substantially all of the zinc therefrom as zinc hydroxide. There is concurrently formed a solution of calcium dithionate in accordance with Equation No. 4 above noted. The zinc hydroxide is separated from the mixture by decantation, filtration, or the like, and is preferably calcined at a low temperature known to those skilled in the art, to convert it to substantially pure zinc oxide. The zinc oxide produced in accordance with this process is of sufficient purity for employment in the arts, such as, for example, in the production of pigments or the like, or it may be treated by known methods for the production of zinc metal.

The calcium dithionate solution formed during the final precipitation is employed for the treatment of further zinc sulfate as previously described, and is thus cyclically employed in the process.

If desired, the calcium dithionate can alternatively be returned directly to the initial extraction mixture wherein the oxidized ore of zinc is treated in aqueous suspension with sulfur dioxide and air, whereby, of course, the zinc sulfate is converted to zinc dithionate as soon as it is formed. Obviously, however, the calcium sulfate is not then separately recovered but is separated along with the gangue materials.

A suitable source of sulfur dioxide containing molecular oxygen is the roaster gases from the initial roasting of sulfide ores of zinc. Any other suitable source of sulfur dioxide and molecular oxygen can be employed, for example, smelter gases, or the gases produced by burning sulfur or pyrites in the presence of an excess of air. It is to be noted that while sulfur dioxide and oxygen are employed in the instant process, any sulfites which may be formed are purely transitory and are oxidized either to dithionates or to sulfates during the extraction.

The following examples illustrate the practice of this invention without, however, limiting the invention thereto:

(1) A sample of a sulfide zinc concentrate was roasted at 850° to 950° C., and the resulting calcine was suspended in water and leached with a mixture of sulfur dioxide and air containing approximately 3 percent sulfur dioxide by volume. The slurry was filtered, the residue was washed with water, and filtrate was treated with calcium dithionate solution. The precipitated calcium sulfate was filtered out and the filtrate treated with hydrated lime to give a pH of 7.5. The zinc precipitate was calcined at 1000° C. The results are tabulated below:

|  | Analysis | | | | |
|---|---|---|---|---|---|
|  | Percent | | | Ounces per ton | |
|  | Zn | Pb | Fe | Au | Ag |
| Concentrate | 40.3 | 2.1 | 13.4 | 0.072 | 4.8 |
| Calcine | 47.8 | 2.4 | 15.8 | 0.085 | 5.7 |
| Residue | 20.0 | 6.0 | 38.3 | 0.21 | 14.2 |
| Zinc product | 65.2 | Nil | 0.8 | | |

Extraction of zinc from calcine, per cent___ 83.2
Precipitation of extracted zinc, per cent____ 95.4
Dithionate ion formed, pounds per ton of calcine _____ 60.0

(2) A sample of oxidized lead-zinc ore, assaying 24.4 percent zinc and 19.4 percent lead, was leached in a similar manner, without being roasted. The leach filtrate was not treated further. However, 84.8 percent of the zinc was extracted, 21 pounds of dithionate ion was formed per ton of ore, and the residue assayed 36 percent lead.

One of the important features of this invention is that dithionate ion in the form of zinc dithionate is produced in accordance with Equation 2 above noted. For example, in a series of 15 leaching tests on various ores and calcines, the average quantity of dithionate ion thus produced was 50 pounds per ton of material leached. This is more than enough to replace the losses of dithionate ion that would normally occur in actual plant operation as a result, for instance, of incomplete washing of the leach residue, calcium sulfate precipitate, and zinc hydroxide precipitate.

It will thus be apparent that this invention provides a simple and efficient means for the extraction of zinc values from oxidized zinc ores or ores of zinc which can be converted to the oxidized state by roasting. Various modifications may be made in the invention as above described. For example, the final calcium dithionate solution from which zinc hydroxide has been removed can be evaporated and concentrated before return to the dithionate precipitation step. In the event zinc ores containing iron are being treated, any iron that may be extracted can be removed prior to the final zinc precipitation step by the portionwise addition of zinc hydroxide or slacked lime to the zinc dithionate solution. When the pH of the solution has thus been raised to about pH 3.5, the iron precipitates out of solution and it can then be filtered or otherwise removed before the final zinc precipitation.

In initiating the process, it is desirable to prepare a quantity of calcium dithionate for the initial precipitation which can be done by means known to those skilled in the art. Alternatively, calcium chloride or other soluble calcium salt whose anion does not form an insoluble zinc compound, can initially be employed pending the formation of sufficient dithionate ion to render the process self-sustaining. In general, it is desirable that an excess of calcium dithionate be formed in order that during continuous operation a small proportion of the zinc-free calcium dithionate solution containing any residual soluble impurities, can continually be discarded while the great bulk of the calcium dithionate solution is continually recirculated.

Although the presently preferred embodiment of this invention has been described above, many changes and apparently differing embodiments thereof can be made by one skilled in the art without departing from the spirit and scope of the invention.

What is claimed is:

A process for the production of zinc hydroxide from oxidized ores of zinc which comprises treating an aqueous mixture of such an ore with excess sulfur dioxide under oxidizing conditions to dissolve the zinc values as zinc dithionate and zinc sulfate, separating a zinc solution from insoluble gangue, treating the solution thus formed with calcium dithionate to precipitate calcium sulfate and convert the sulfate of zinc to zinc dithionate, separating the sulfate precipitate, then treating the resulting sulfate-free dithionate solution with calcium hydroxide to form soluble calcium dithionate and purified zinc hydroxide precipitate, removing and recovering zinc hydroxide, and returning the calcium dithionate to treatment of further sulfate-containing zinc solutions as before.

SOL FREDERICK RAVITZ.
ALEXANDER E. BACK.

REFERENCES CITED

The following references are of record in the file of this patent:

"An Outline of First Year College Chemistry," by J. R. Lewis, 6th ed., pp. 48–50. Barnes & Noble, Inc., N. Y.

J. W. Mellor's "Modern Inorganic Chemistry," single vol. ed., Jan. 1935 printing, pp. 432–433. Longmans, Green & Co., N. Y.

J. W. Mellor's "A Comprehensive Treatise on Inorganic and Theoretical Chemistry," vol. 10, 1930 ed., pp. 588, 592. Longmans, Green & Co., N. Y.